(12) United States Patent
Zhang

(10) Patent No.: US 11,366,535 B2
(45) Date of Patent: Jun. 21, 2022

(54) TOUCH DISPLAY PANEL AND TOUCH DISPLAY DEVICE HAVING REGULAR-SHAPED TOUCH ELECTRODE AND IRREGULAR-SHAPED TOUCH ELECTRODE WITH SAME AREA

(71) Applicant: WUHAN CHINA STAR OPTOELECTRONICS TECHNOLOGY CO., LTD., Hubei (CN)

(72) Inventor: Hongsen Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 246 days.

(21) Appl. No.: 16/632,918

(22) PCT Filed: Oct. 30, 2019

(86) PCT No.: PCT/CN2019/114191
§ 371 (c)(1),
(2) Date: Jan. 22, 2020

(87) PCT Pub. No.: WO2021/035934
PCT Pub. Date: Mar. 4, 2021

(65) Prior Publication Data
US 2021/0405789 A1   Dec. 30, 2021

(30) Foreign Application Priority Data

Aug. 23, 2019 (CN) .................. 201910783011.4

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 2203/04111* (2013.01)

(58) Field of Classification Search
CPC .................. G06F 3/0412; G06F 3/044; G06F 2203/04111; G06F 3/041; G06F 3/0443
See application file for complete search history.

(56) References Cited

U.S. PATENT DOCUMENTS

2016/0291715 A1* 10/2016 Kim ..................... G06F 3/042
2017/0083153 A1* 3/2017 Yeh ...................... G06F 3/041
(Continued)

FOREIGN PATENT DOCUMENTS

CN    107357096 A    11/2017
CN    107390920 A    11/2017
(Continued)

*Primary Examiner* — Yaron Cohen

(57) ABSTRACT

A touch display panel and a touch display device are provided, which include a display substrate and a touch panel. The touch panel includes a first touch zone corresponding to a regular display area of the display substrate and a second touch zone corresponding to an irregular display area of the display substrate. The first touch zone includes at least one first touch electrode, the second touch zone includes at least one second touch electrode, and at least a portion of the second touch electrode extends into the first touch zone. Thus, areas of the second touch electrode and the first touch electrode are equal or as similar as possible, thereby improving a touch sensitivity and accuracy and a uniformity of display of the touch display panel and the touch display device.

17 Claims, 3 Drawing Sheets

(56) References Cited

U.S. PATENT DOCUMENTS

2018/0232104 A1    8/2018   Kubo et al.
2020/0210027 A1    7/2020   Ma et al.

FOREIGN PATENT DOCUMENTS

| CN | 108334245 A | 7/2018 |
| CN | 108762548 A | 11/2018 |
| CN | 109725771 A | 5/2019 |
| CN | 109725774 A | 5/2019 |

* cited by examiner

TOUCH DISPLAY PANEL AND TOUCH DISPLAY DEVICE HAVING REGULAR-SHAPED TOUCH ELECTRODE AND IRREGULAR-SHAPED TOUCH ELECTRODE WITH SAME AREA

FIELD OF DISCLOSURE

The present disclosure relates to the field of display technologies, and in particular, to a touch display panel and a touch display device.

BACKGROUND

Applications of touch technologies in display devices are very mature. At present, by an in-cell touch technology, a touch circuit can be integrated into a display panel to reduce an overall thickness of a display device and increase a light transmittance of the display panel. Thus, it is favored by major panel manufacturers.

An in-cell touch display panel needs to meet a touch panel that overlaps with a display area of the display substrate. In order to meet demanding needs of consumers for display devices, panel developers have developed a special-shaped display panel designed to achieve a narrow bezel and a high screen-to-body ratio. In a special-shaped screen, especially a special-shaped area, such as an inner hole area, a curved area, a concave area, an overlap design of the touch panel and the display area of the display substrate has many problems. In a regular display area, touch electrodes in the touch panel are usually designed in a regular square or rectangular structure. In an irregular area, in order to meet the touch panel that overlaps with the display substrate, touch electrodes are designed with an irregular shape, and an area of one touch electrode in the irregular area is also smaller than that of the one touch electrode in the regular display area. There are electrode lines such as touch lines, gate lines, and data lines around the touch electrodes. A capacitance is generated between the electrode lines and the touch electrodes. A difference between the area of one touch electrode in the irregular display area and the area of one touch electrode in the regular display area may result in a difference in capacitances between the two and the electrode lines. This difference in capacitances affects a touch function of an entire touch panel. Moreover, in a design of the touch electrodes serving as common electrodes, such the difference in capacitances causes a difference in electric fields, thereby causing uneven display of the display panel.

SUMMARY OF DISCLOSURE

A difference between the area of one touch electrode in the irregular display area and the area of one touch electrode in the regular display area may result in a difference in capacitances between the two and the electrode lines, thereby affecting a touch function of the touch panel. Moreover, in a design of the touch electrodes serving as common electrodes, such the difference in capacitances causes a difference in electric fields, thereby causing uneven display of the display panel.

In order to solve the above technical problems, the present disclosure provides technical solutions as follows.

The present disclosure provides a touch display panel, including a display substrate and a touch panel.

The display substrate includes a regular display area and an irregular display area.

The touch panel is disposed on a display surface of the display substrate and includes a first touch zone corresponding to the regular display area and a second touch zone corresponding to the irregular display area.

The first touch zone includes at least one first touch electrode, the second touch zone includes at least one second touch electrode, and at least a portion of the second touch electrode extends into the first touch zone.

In the touch display panel of the present disclosure, the irregular display area includes at least one of a curved display area, a concave display area, and a display area with an internal hole.

In the touch display panel of the present disclosure, an area of the second touch electrode is equal to or approximate to an area of the first touch electrode.

In the touch display panel of the present disclosure, the first touch zone includes a plurality of the first touch electrodes, and one of the first touch electrodes adjacent to the second touch electrode in a first direction is defined as a first adjacent electrode.

A boundary between the second touch electrode and the first adjacent electrode is located in the first touch zone.

In the touch display panel of the present disclosure, a size of the first adjacent electrode along the first direction is less than a size of one of the first touch electrodes except the first adjacent electrode along the first direction.

In the touch display panel of the present disclosure, one of the first touch electrodes adjacent to the first adjacent electrode in the first direction is defined as a second adjacent electrode.

The first adjacent electrode extends toward the second adjacent electrode along the first direction.

In the touch display panel of the present disclosure, a size of the second adjacent electrode along the first direction is less than a size of one of the first touch electrodes except the first adjacent electrode and the second adjacent electrode along the first direction.

In the touch display panel of the present disclosure, one of the first touch electrodes adjacent to the second touch electrode in a second direction is defined as a third adjacent electrode A boundary between the second touch electrode and the third adjacent electrode is located in the first touch zone.

In the touch display panel of the present disclosure, a size of the third adjacent electrode along the second direction is less than a size of one of the first touch electrodes except the first adjacent electrode and the third adjacent electrode along the second direction.

In the touch display panel of the present disclosure, one of the first touch electrodes adjacent to the third adjacent electrode in the second direction is defined as a fourth adjacent electrode.

The third adjacent electrode extends toward the fourth adjacent electrode along the second direction.

In the touch display panel of the present disclosure, a size of the fourth adjacent electrode along the second direction is less than a size of one of the first touch electrodes except the first adjacent electrode, the third adjacent electrode, and the fourth adjacent electrode along the second direction.

In the touch display panel of the present disclosure, the irregular display area includes a curved display area, and the first touch zone includes a plurality of the first touch electrodes, one of the first touch electrodes adjacent to the second touch electrode in a first direction is defined as a first adjacent electrode, and one of the first touch electrodes adjacent to the second touch electrode in a second direction is defined as a third adjacent electrode.

A boundary between the second touch electrode and the first adjacent electrode is located in the first touch zone, and a size of the first adjacent electrode along the first direction is less than a size of one of the first touch electrodes except the first adjacent electrode along the first direction; and/or a boundary between the second touch electrode and the third adjacent electrode is located in the first touch zone, and a size of the third adjacent electrode along the second direction is less than a size of one of the first touch electrodes except the first adjacent electrode and the third adjacent electrode along the second direction.

In the touch display panel of the present disclosure, the irregular display area includes a concave display area, and the first touch zone includes a plurality of the first touch electrodes, one of the first touch electrodes adjacent to the second touch electrode in a first direction is defined as a first adjacent electrode.

A boundary between the second touch electrode and the first adjacent electrode is located in the first touch zone, and a size of the first adjacent electrode along the first direction is less than a size of one of the first touch electrodes except the first adjacent electrode along the first direction.

In the touch display panel of the present disclosure, the irregular display area includes a display area with an internal hole, and the first touch zone includes a plurality of the first touch electrodes, one of the first touch electrodes adjacent to the second touch electrode in a first direction is defined as a first adjacent electrode, and one of the first touch electrodes adjacent to the second touch electrode in a second direction is defined as a third adjacent electrode.

A boundary between the second touch electrode and the first adjacent electrode is located in the first touch zone, and a size of the first adjacent electrode along the first direction is less than a size of one of the first touch electrodes except the first adjacent electrode along the first direction.

A boundary between the second touch electrode and the third adjacent electrode is located in the first touch zone, and a size of the third adjacent electrode along the second direction is less than a size of one of the first touch electrodes except the first adjacent electrode and the third adjacent electrode along the second direction.

In the touch display panel of the present disclosure, the first touch electrode includes a rectangular or square electrode.

In the touch display panel of the present disclosure, the first touch electrode and the second touch electrode are electrically connected to a touch chip through correspondingly touch lines, and the touch chip is configured to detect a touch signal on the first touch electrode and the second touch electrode.

The present disclosure also provides a touch display device including a touch display panel. The touch display panel includes a display substrate and a touch panel.

The display substrate includes a regular display area and an irregular display area.

The touch panel is disposed on a display surface of the display substrate and includes a first touch zone corresponding to the regular display area and a second touch zone corresponding to the irregular display area.

The first touch zone includes at least one first touch electrode, the second touch zone includes at least one second touch electrode, and at least a portion of the second touch electrode extends into the first touch zone.

In the touch display device of the present disclosure, the first touch zone includes a plurality of the first touch electrodes, one of the first touch electrodes adjacent to the second touch electrode in a first direction is defined as a first adjacent electrode, and one of the first touch electrodes adjacent to the second touch electrode in a second direction is defined as a third adjacent electrode.

A boundary between the second touch electrode and the first adjacent electrode is located in the first touch zone, and a size of the first adjacent electrode along the first direction is less than a size of one of the first touch electrodes except the first adjacent electrode along the first direction; and/or a boundary between the second touch electrode and the third adjacent electrode is located in the first touch zone, and a size of the third adjacent electrode along the second direction is less than a size of one of the first touch electrodes except the first adjacent electrode and the third adjacent electrode along the second direction.

The present disclosure provides the touch display panel and the touch display device which include the display substrate and the touch panel. The touch panel includes the first touch zone corresponding to the regular display area of the display substrate and the second touch zone corresponding to the irregular display area of the display substrate. By extending the touch electrode in the second touch zone into the first touch zone, the area of the touch electrode in the first touch zone is approximate to or equal to the area of the touch electrode in the second touch zone such that a touch accuracy and sensitivity and a uniformity of display of the touch display panel and the touch display device can be improved.

BRIEF DESCRIPTION OF DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
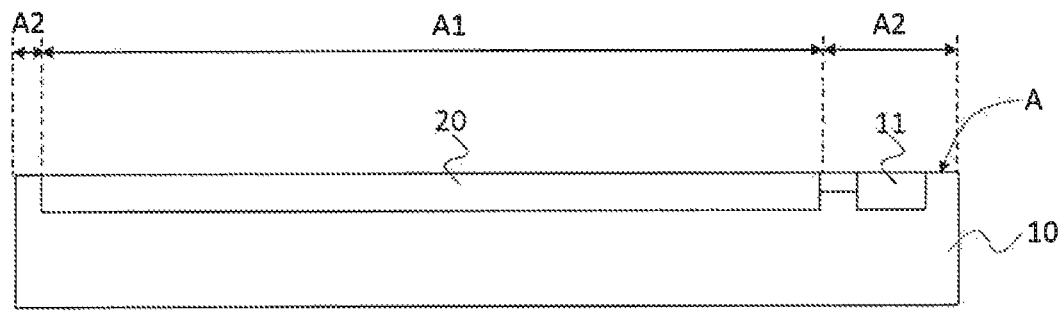
FIG. 1 is a schematic diagram of a touch display panel according to an embodiment of the present disclosure.

Description will be given by the preferred embodiments along with the accompanied drawings. It can be used to implement a specific embodiment. Direction terms are mentioned in the present disclosure, for example, "upper", "lower", "front", "back", "left", "right", "inside", "outside", "side" and so on, only refer to the direction of accompanied drawings. Thus, it is better and clearer to describe and understand the present disclosure by using direction terms, but the present disclosure is not limited thereto. In the drawings, similar structural units are designated by the same reference numerals.

An embodiment of the present disclosure provides a touch display panel. By extending a boundary of a touch electrode in an irregular display area into a regular display area, an area of the touch electrode in the irregular display area is increased to be equal to or approximate to another touch electrode in the regular display area. Therefore, a capacitance between the touch electrode and an electrode line in the irregular display area being less than a capacitance between the touch electrode and an electrode line in the regular display area is prevented, and a touch sensitivity and accuracy and a uniformity of display of the touch display panel can be improved.

FIG. 1 is a schematic diagram of a touch display panel according to an embodiment of the present disclosure. The touch display panel includes a display substrate 10 and a touch panel 20. The display substrate 10 includes a display surface A, and the touch panel 20 is disposed on the display surface A of the display substrate 10. Alternatively, the display surface A is divided into a display area A1 and a non-display area A2. The display area A1 has a function of displaying an image, and the non-display area A2 does not have a function of displaying an image. A line binding module of the display substrate 10 is mainly disposed in the non-display area A2.

Alternatively, the touch display panel further includes a touch chip 11 disposed in the non-display area A2 and electrically connected to the touch panel 20. The touch chip 11 is configured to detect and analyze a touch signal on the touch panel 20.

Figure 2:
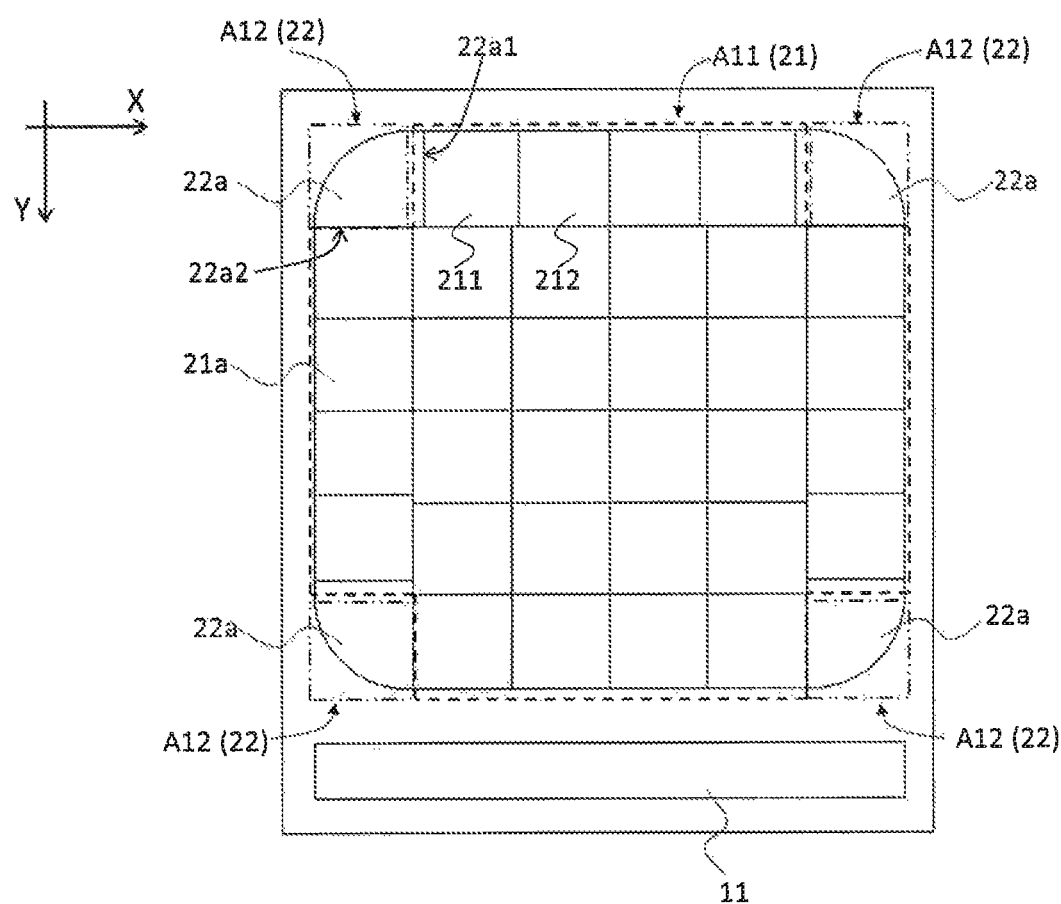
FIG. 2 is a top view of the touch display panel of FIG. 1, where an irregular display area is a curved display area.

Specifically, as shown in FIG. 1 and FIG. 2, FIG. 2 is a top view of the touch display panel of FIG. 1. The display area A1 includes a regular display area A11 and an irregular display area A12, and the irregular display area A12 is a curved display area.

The touch panel 20 completely overlaps with the display area A1. The touch panel 20 corresponding to the regular display area A11 is a first touch zone 21, and the touch panel 20 corresponding to the irregular display area A12 is a second touch zone 22. The first touch zone 21 includes at least one first touch electrode 21a, and the second touch zone 22 includes at least one second touch electrode 22a. It should be noted that, since the irregular display area A12 has a specific irregular shape, the second touch electrode 22a also has a shape corresponding thereto. When the display surface A is divided into the regular display area and the irregular display area, it should be understood that, all the touch electrodes with irregular structures corresponding to the shape of the irregular display area A12 are located in the irregular display area A12 (i.e., belonging to the second touch zone 22), and all touch electrodes with regular shapes are located in the regular display area A11 (i.e., belonging to the first touch zone 21).

Each of the first touch electrodes 21a and each of the second touch electrodes 22a are electrically connected to the touch chip 11 through touch lines. The touch chip 11 is configured to detect a touch signal on the first touch electrodes 21a and the second touch electrodes 22a.

Optionally, the first touch electrode 21a is a rectangular or square electrode.

At least a portion of a boundary of one of the second touch electrodes 22a extends into the first touch zone 21 to increase an area of the second touch electrode 22a. Preferably, after the boundary is extended, the area of the second touch electrode 22a is equal to or approximate to an area of one of the first touch electrodes 21a. It should be noted that in a vicinity of the touch panel 20 (for example, in an upper layer structure or a lower layer structure of the touch panel 20), there are vertical and horizontal staggered electrode lines, such as gate lines, data lines, and touch lines. Sensing capacitances are formed between the electrode lines and the touch electrodes. These sensing capacitances have a significant impact on touch and display capabilities of the touch display panel. Therefore, when the area of the second touch electrode 22a is equal to or approximate to the area of the first touch electrode 21a, the capacitances formed by the second touch electrode 22a and the first touch electrode 21a and the electrode lines are the same or as similar as possible, thereby ensuring a touch accuracy and sensitivity and a uniformity of display of the touch display panel.

Specifically, the second touch electrode 22a includes a first boundary 22a1 and a second boundary 22a2. The first boundary 22a1 extends into the first touch zone 21 along a first direction X such that a part of a structure of the second touch electrode 22a is located in the first touch zone 21 to increase the area of the second touch electrode 22a. Alternatively, the second boundary 22a2 may extend into the first touch zone 21 along a second direction Y, thereby further increasing the area of the second touch electrode 22a. It is desirable to make the area of the second touch electrode 22a as similar as possible or equal to the area of the first touch electrode 21a.

One of the first touch electrodes 21a adjacent to the second touch electrode 22a in the first direction X is defined as a first adjacent electrode 211, and one of the first touch electrodes 21a adjacent to the first adjacent electrode 211 in the first direction X is defined as a second adjacent electrode 212. Since the second touch electrode 22a extends into the first touch zone 21 along the first direction X, a boundary between the second touch electrode 22a and the first adjacent electrode 211 is located in the first touch zone 21. Moreover, since the second touch electrode 22a occupies a portion of a space of the first adjacent electrode 211, a size of the first adjacent electrode 211 along the first direction X is less than a size of one of the first touch electrodes 21a except the first adjacent electrode 211 along the first direction X.

Alternatively, the first adjacent electrode 211 extends into the second adjacent electrode 212 along the first direction X, so the first adjacent electrode 211 occupies a portion of a space of the second adjacent electrode 212, thereby an area of the second adjacent electrode 212 is decreased. Therefore, a size of the second adjacent electrode 212 along the first direction X is less than a size of one of the first touch electrodes 21a except the first adjacent electrode 211 and the second adjacent electrode 212 along the first direction X. It should be understood that, by adjusting the boundaries of the second touch electrode 22a, the first adjacent electrode 211, and the second adjacent electrode 212, the area of the second touch electrode 22a is approximate to the area of the first touch electrode 21a. Moreover, the areas of the first adjacent electrode 211 and the second adjacent electrode 212 are approximate to or equal to the area of one of the first touch electrodes 21a except the first adjacent electrode 211 and the second adjacent electrode 212, so that areas of the touch electrodes of the touch panel 20 are the same or as similar as possible. Thus, a touch sensitivity and accuracy and a uniformity of display of the touch display panel are increased.

Alternatively, in order to further achieve that the area of the second touch electrode 22a is the same as the area of the first touch electrode 21a, the area of the second adjacent electrode 212 is adjusted, and also areas of another electrodes adjacent to the second adjacent electrode may be further adjusted. The present disclosure is not limited to adjusting areas of former two layers of touch electrodes adjacent to the second touch electrode 22a, and an adjustment of subsequent adjacent electrodes can be performed according to the above method based on actual needs.

Alternatively, the second touch electrode 22a may also be extended into the first touch zone 21 along the second direction Y, and an extension method is the same as the foregoing extension method along the first direction X, and details are not described herein again.

In this embodiment, by extending the boundary of the second touch electrode 22a into the first touch zone 21 and adjusting the boundary of the first touch electrode 21a of a corresponding position in the first touch zone 21 to make the areas of the second touch electrode 22a and the first touch electrode 21a are equal or as similar as possible to improve the touch sensitivity and accuracy and the uniformity of display of the touch display panel.

It should be noted that the area of the first touch electrode or the area of the second touch electrode described in the present disclosure refers only to the area of a single first touch electrode or the area of a single second touch electrode.

Figure 3:
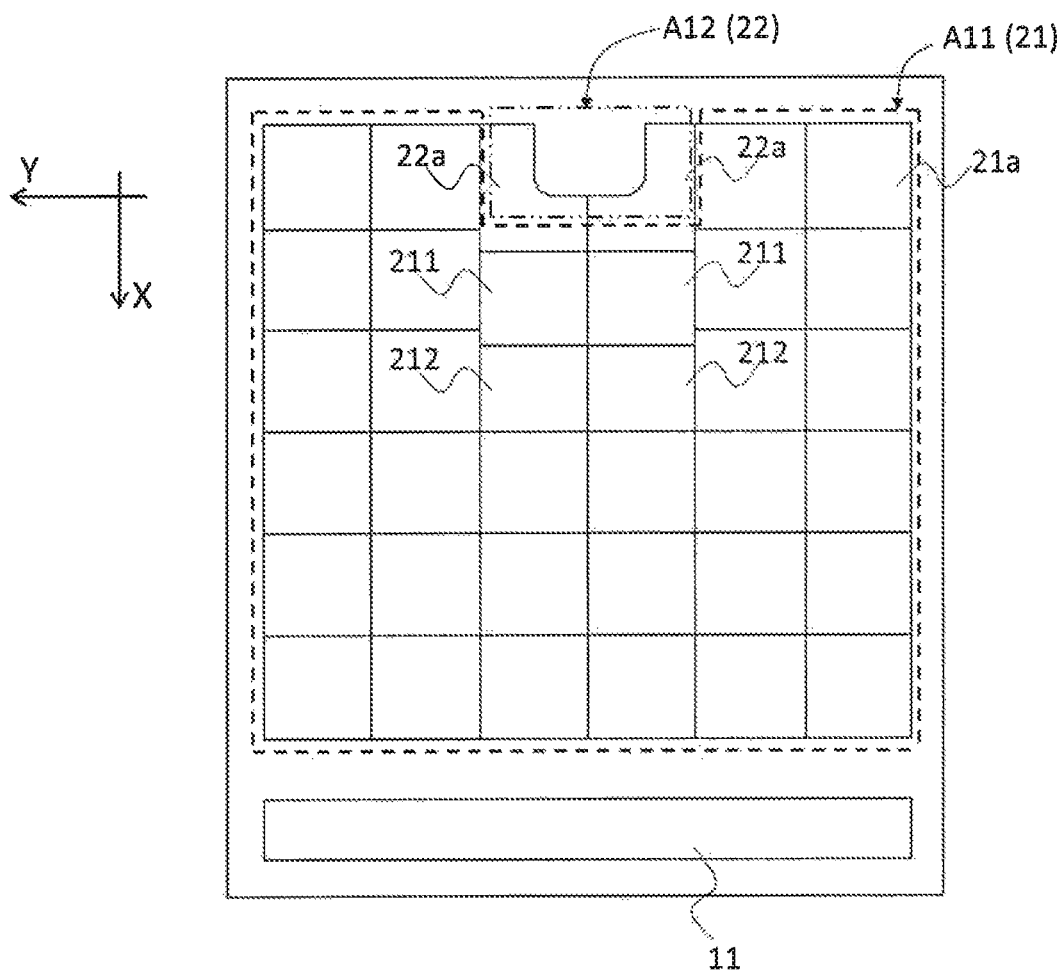
FIG. 3 is a top view of the touch display panel of FIG. 1, where an irregular display area is a concave display area.

According to an embodiment of the present disclosure, as shown in FIG. 1 and FIG. 3, the irregular display area A12 is a concave display area. The first touch zone 21 corresponding to the regular display area A11 includes at least one first touch electrode 21a, and the second touch zone 22 corresponding to the irregular display area A12 includes at least one second touch electrode 22a. The second touch electrode 22a has an irregular shape corresponding to the irregular display area A12, and the first touch electrode 21a has a regular rectangular or square structure.

The second touch electrode 22a extends into the first touch zone 21 along the first direction X such that a part of a structure of the second touch electrode 22a is located in the first touch zone 21 to increase the area of the second touch electrode 22a. Alternatively, the second boundary 22a2 may extend into the first touch zone 21 along a second direction Y, thereby further increasing the area of the second touch electrode 22a. It is desirable to make the area of the second touch electrode 22a as similar as possible or equal to the area of the first touch electrode 21a.

One of the first touch electrodes 21a adjacent to the second touch electrode 22a in the first direction X is defined as a first adjacent electrode 211, and one of the first touch electrodes 21a adjacent to the first adjacent electrode 211 in the first direction X is defined as a second adjacent electrode 212. Since the second touch electrode 22a extends into the first touch zone 21 along the first direction X, a boundary between the second touch electrode 22a and the first adjacent electrode 211 is located in the first touch zone 21. Moreover, since the second touch electrode 22a occupies a portion of a space of the first adjacent electrode 211, a size of the first adjacent electrode 211 along the first direction X is less than a size of one of the first touch electrodes 21a except the first adjacent electrode 211 along the first direction X.

Alternatively, the first adjacent electrode 211 extends into the second adjacent electrode 212 along the first direction X, so the first adjacent electrode 211 occupies a portion of a space of the second adjacent electrode 212, thereby an area of the second adjacent electrode 212 is decreased. Therefore, a size of the second adjacent electrode 212 along the first direction X is less than a size of one of the first touch electrodes 21a except the first adjacent electrode 211 and the second adjacent electrode 212 along the first direction X. It should be understood that, by adjusting the boundaries of the second touch electrode 22a, the first adjacent electrode 211, and the second adjacent electrode 212, the area of the second touch electrode 22a is approximate to the area of the first touch electrode 21a. Moreover, the areas of the first adjacent electrode 211 and the second adjacent electrode 212 are approximate to or equal to the area of one of the first touch electrodes 21a except the first adjacent electrode 211 and the second adjacent electrode 212, so that areas of the touch electrodes of the touch panel 20 are the same or as similar as possible. Thus, a touch sensitivity and accuracy and a uniformity of display of the touch display panel are increased.

Alternatively, in order to further achieve that the area of the second touch electrode 22a is the same as the area of the first touch electrode 21a, the area of the second adjacent electrode 212 is adjusted, and also areas of another electrodes adjacent to the second adjacent electrode may be further adjusted. The present disclosure is not limited to adjusting areas of former two layers of touch electrodes adjacent to the second touch electrode 22a, and an adjustment of subsequent adjacent electrodes can be performed according to the above method based on actual needs.

Alternatively, the second touch electrode 22a may also be extended into the first touch zone 21 along the second direction Y, and an extension method is the same as the foregoing extension method along the first direction X, and details are not described herein again.

Figure 4:
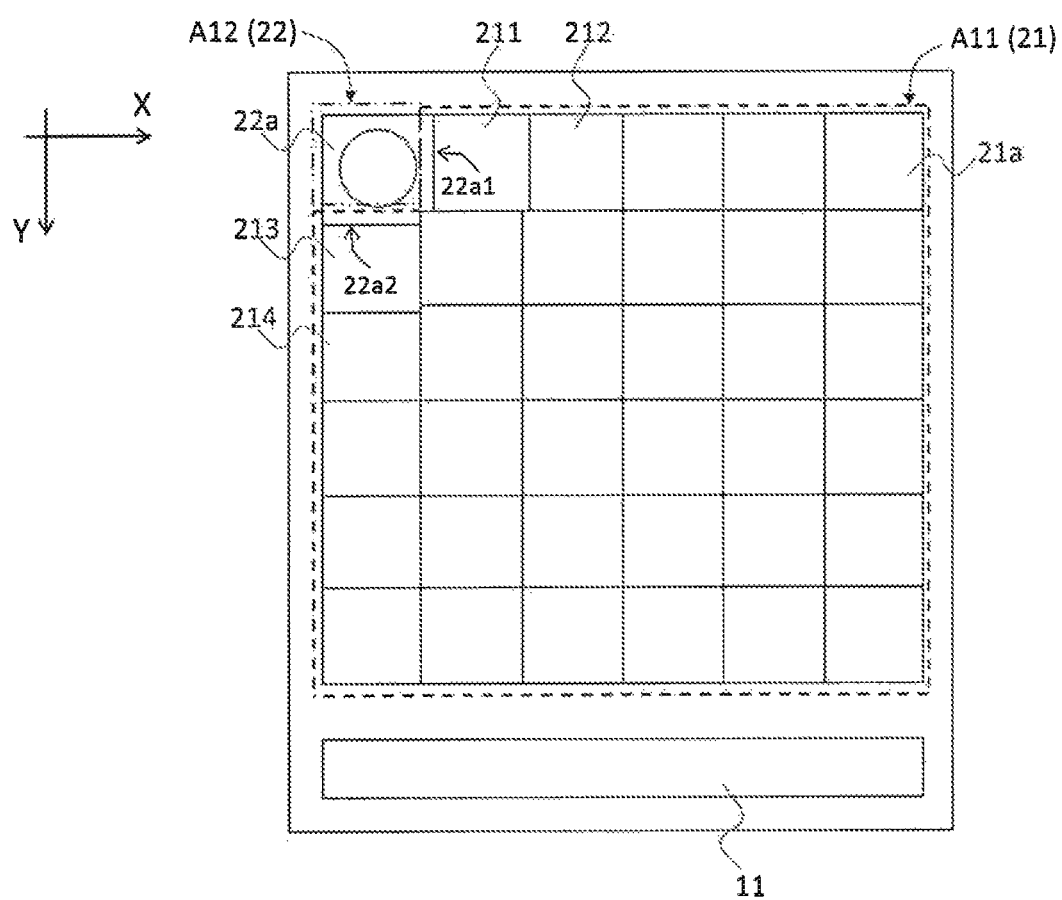
FIG. 4 is a top view of the touch display panel of FIG. 1, where an irregular display area is a display area with an internal circular hole.

According to an embodiment of the present disclosure, as shown in FIG. 1 and FIG. 4, the irregular display area A12 is a display area with an internal hole. The first touch zone 21 corresponding to the regular display area A11 includes at least one first touch electrode 21a, and the second touch zone 22 corresponding to the irregular display area A12 includes at least one second touch electrode 22a. The second touch electrode 22a has an irregular shape corresponding to the irregular display area A12, and the first touch electrode 21a has a regular rectangular or square structure.

The second touch electrode 22a includes a first boundary 22a1 and a second boundary 22a2. The first boundary 22a1 extends into the first touch zone 21 along a first direction X such that a part of a structure of the second touch electrode 22a is located in the first touch zone 21 to increase the area of the second touch electrode 22a. Alternatively, the second boundary 22a2 may extend into the first touch zone 21 along a second direction Y, thereby further increasing the area of the second touch electrode 22a. It is desirable to make the area of the second touch electrode 22a as similar as possible or equal to the area of the first touch electrode 21a.

Furthermore, one of the first touch electrodes 21a adjacent to the second touch electrode 22a in the first direction X is defined as a first adjacent electrode 211, and one of the first touch electrodes 21a adjacent to the first adjacent electrode 211 in the first direction X is defined as a second adjacent electrode 212. Also, one of the first touch electrodes 21a adjacent to the second touch electrode 22a in the second direction Y is defined as a third adjacent electrode 213, and one of the first touch electrodes 21a adjacent to the third adjacent electrode 213 in the second direction Y is defined as a fourth adjacent electrode 214. Since the second touch electrode 22a extends into the first touch zone 21 along the first direction X, a boundary between the second touch electrode 22a and the first adjacent electrode 211 is located in the first touch zone 21. Moreover, since the second touch electrode 22a occupies a portion of a space of the first adjacent electrode 211, a size of the first adjacent electrode 211 along the first direction X is less than a size of one of the first touch electrodes 21a except the first adjacent electrode 211 along the first direction X.

Alternatively, the first adjacent electrode 211 extends into the second adjacent electrode 212 along the first direction X, so the first adjacent electrode 211 occupies a portion of a space of the second adjacent electrode 212, thereby an area of the second adjacent electrode 212 is decreased. Therefore, a size of the second adjacent electrode 212 along the first direction X is less than a size of one of the first touch electrodes 21a except the first adjacent electrode 211 and the second adjacent electrode 212 along the first direction X.

Alternatively, the second touch electrode 22a extends into the third adjacent electrode 213 along the second direction Y, so a boundary of the second touch electrode 22a is located in the first touch zone 21, and the second touch electrode 22a occupies a portion of a space of the third adjacent electrode 213, thereby an area of the third adjacent electrode 213 is decreased. Therefore, a size of the third adjacent electrode 213 along the second direction Y is less than a size of one of the first touch electrodes 21a except the third adjacent electrode 213 along the second direction Y.

Alternatively, the third adjacent electrode 213 extends into the fourth adjacent electrode 214 along the second direction Y, so the third adjacent electrode 213 occupies a portion of a space of the fourth adjacent electrode 214, thereby an area of the fourth adjacent electrode 214 is decreased. Therefore, a size of the fourth adjacent electrode 214 along the second direction Y is less than a size of one of the first touch electrodes 21a except the third adjacent electrode 213 and the fourth adjacent electrode 214 along the second direction Y.

It should be understood that, by adjusting the boundaries of the second touch electrode 22a, the first adjacent electrode 211, the second adjacent electrode 212, the third adjacent electrode 213, and fourth adjacent electrode 214, the area of the second touch electrode 22a is approximate to the area of the first touch electrode 21a. Moreover, the areas of the first adjacent electrode 211, the second adjacent electrode 212, the third adjacent electrode 213, and fourth adjacent electrode 214 are approximate to or equal to the area of one of the first touch electrodes 21a that is not adjusted, so that areas of the touch electrodes of the touch panel 20 are the same or as similar as possible. Thus, a touch sensitivity and accuracy and a uniformity of display of the touch display panel are increased.

Alternatively, after adjusting the area of the first touch electrode 21a adjacent to the second touch electrode 22a, the area of remaining first touch electrodes 21a around the second touch electrode 22a may be further adjusted according to the above method to achieve that the areas of touch electrodes of the touch panel are the same.

In summary, in the embodiments of the present disclosure, by extending the boundary of the second touch electrode into the first touch zone and adjusting the boundary of the first touch electrode of a corresponding position in the first touch zone to make the areas of the second touch electrode and the first touch electrode are equal or as similar as possible, thereby improving the touch sensitivity and accuracy and the uniformity of display of the touch display panel.

An embodiment of the present disclosure also provides a touch display device. The touch display device includes the touch display panel provided by the embodiments of the present disclosure, which also has the advantages of the touch display panel provided by the embodiments of the present disclosure.

The present disclosure has been described with preferred embodiments thereof and it is understood that many changes and modifications to the described embodiments can be carried out without departing from the scope and the spirit of the disclosure that is intended to be limited only by the appended claims.

What is claimed is:
1. A touch display panel, comprising:
   a display substrate comprising a regular display area and an irregular display area; and
   a touch panel disposed on a display surface of the display substrate and comprising a first touch zone corresponding to the regular display area and a second touch zone corresponding to the irregular display area;
   wherein the first touch zone comprises at least one first touch electrode, the second touch zone comprises at least one second touch electrode, the first touch electrode has a rectangular regular shape, the second touch electrode has a non-rectangular irregular shape, and at least a portion of the second touch electrode extends into the first touch zone; and
   wherein the first touch zone comprises a plurality of the first touch electrodes, one of the first touch electrodes adjacent to the second touch electrode in a first direction is defined as a first adjacent electrode, and an area of the second touch electrode with the non-rectangular irregular shape is equal to an area of the first adjacent electrode with the rectangular regular shape.

2. The touch display panel as claimed in claim 1, wherein the irregular display area comprises at least one of a curved display area, a concave display area, and a display area with an internal hole.

3. The touch display panel as claimed in claim 1, wherein a boundary between the second touch electrode and the first adjacent electrode is located in the first touch zone.

4. The touch display panel as claimed in claim 3, wherein a size of the first adjacent electrode along the first direction is less than a size of one of the first touch electrodes except the first adjacent electrode along the first direction.

5. The touch display panel as claimed in claim 3, wherein one of the first touch electrodes adjacent to the first adjacent electrode in the first direction is defined as a second adjacent electrode; and
   the first adjacent electrode extends toward the second adjacent electrode along the first direction.

6. The touch display panel as claimed in claim 5, wherein a size of the second adjacent electrode along the first direction is less than a size of one of the first touch electrodes except the first adjacent electrode and the second adjacent electrode along the first direction.

7. The touch display panel as claimed in claim 3, wherein one of the first touch electrodes adjacent to the second touch electrode in a second direction is defined as a third adjacent electrode; and
   a boundary between the second touch electrode and the third adjacent electrode is located in the first touch zone.

8. The touch display panel as claimed in claim 7, wherein a size of the third adjacent electrode along the second direction is less than a size of one of the first touch electrodes except the first adjacent electrode and the third adjacent electrode along the second direction.

9. The touch display panel as claimed in claim 7, wherein one of the first touch electrodes adjacent to the third adjacent electrode in the second direction is defined as a fourth adjacent electrode; and
   the third adjacent electrode extends toward the fourth adjacent electrode along the second direction.

10. The touch display panel as claimed in claim 9, wherein a size of the fourth adjacent electrode along the second direction is less than a size of one of the first touch electrodes except the first adjacent electrode, the third adjacent electrode, and the fourth adjacent electrode along the second direction.

11. The touch display panel as claimed in claim 1, wherein the irregular display area comprises a curved display area, and the first touch zone comprises a plurality of the first touch electrodes, one of the first touch electrodes adjacent to the second touch electrode in a first direction is defined as a first adjacent electrode, and one of the first touch electrodes adjacent to the second touch electrode in a second direction is defined as a third adjacent electrode;
- a boundary between the second touch electrode and the first adjacent electrode is located in the first touch zone, and a size of the first adjacent electrode along the first direction is less than a size of one of the first touch electrodes except the first adjacent electrode along the first direction; and/or
- a boundary between the second touch electrode and the third adjacent electrode is located in the first touch zone, and a size of the third adjacent electrode along the second direction is less than a size of one of the first touch electrodes except the first adjacent electrode and the third adjacent electrode along the second direction.

12. The touch display panel as claimed in claim 1, wherein the irregular display area comprises a concave display area, and the first touch zone comprises a plurality of the first touch electrodes, one of the first touch electrodes adjacent to the second touch electrode in a first direction is defined as a first adjacent electrode; and
- a boundary between the second touch electrode and the first adjacent electrode is located in the first touch zone, and a size of the first adjacent electrode along the first direction is less than a size of one of the first touch electrodes except the first adjacent electrode along the first direction.

13. The touch display panel as claimed in claim 1, wherein the irregular display area comprises a display area with an internal hole, and the first touch zone comprises a plurality of the first touch electrodes, one of the first touch electrodes adjacent to the second touch electrode in a first direction is defined as a first adjacent electrode, and one of the first touch electrodes adjacent to the second touch electrode in a second direction is defined as a third adjacent electrode;
- a boundary between the second touch electrode and the first adjacent electrode is located in the first touch zone, and a size of the first adjacent electrode along the first direction is less than a size of one of the first touch electrodes except the first adjacent electrode along the first direction; and
- a boundary between the second touch electrode and the third adjacent electrode is located in the first touch zone, and a size of the third adjacent electrode along the second direction is less than a size of one of the first touch electrodes except the first adjacent electrode and the third adjacent electrode along the second direction.

14. The touch display panel as claimed in claim 1, wherein the first touch electrode comprises a rectangular or square electrode.

15. The touch display panel as claimed in claim 1, wherein the first touch electrode and the second touch electrode are electrically connected to a touch chip through correspondingly touch lines, and the touch chip is configured to detect a touch signal on the first touch electrode and the second touch electrode.

16. A touch display device, comprising a touch display panel, wherein the touch display panel comprises:
- a display substrate comprising a regular display area and an irregular display area; and
- a touch panel disposed on a display surface of the display substrate and comprising a first touch zone corresponding to the regular display area and a second touch zone corresponding to the irregular display area;
- wherein the first touch zone comprises at least one first touch electrode, the second touch zone comprises at least one second touch electrode, the first touch electrode has a rectangular regular shape, the second touch electrode has a non-rectangular irregular shape, and at least a portion of the second touch electrode extends into the first touch zone; and
- wherein the first touch zone comprises a plurality of the first touch electrodes, one of the first touch electrodes adjacent to the second touch electrode in a first direction is defined as a first adjacent electrode, and an area of the second touch electrode with the non-rectangular irregular shape is equal to an area of the first adjacent electrode with the rectangular regular shape.

17. The touch display device as claimed in claim 16, wherein and one of the first touch electrodes adjacent to the second touch electrode in a second direction is defined as a third adjacent electrode;
- a boundary between the second touch electrode and the first adjacent electrode is located in the first touch zone, and a size of the first adjacent electrode along the first direction is less than a size of one of the first touch electrodes except the first adjacent electrode along the first direction; and/or
- a boundary between the second touch electrode and the third adjacent electrode is located in the first touch zone, and a size of the third adjacent electrode along the second direction is less than a size of one of the first touch electrodes except the first adjacent electrode and the third adjacent electrode along the second direction.

* * * * *